(No Model.) 3 Sheets—Sheet 1.
D. C. MÉRIGEAULT.
CHAINLESS CYCLE AND AUTOMOBILE CAR.
No. 589,906. Patented Sept. 14, 1897.
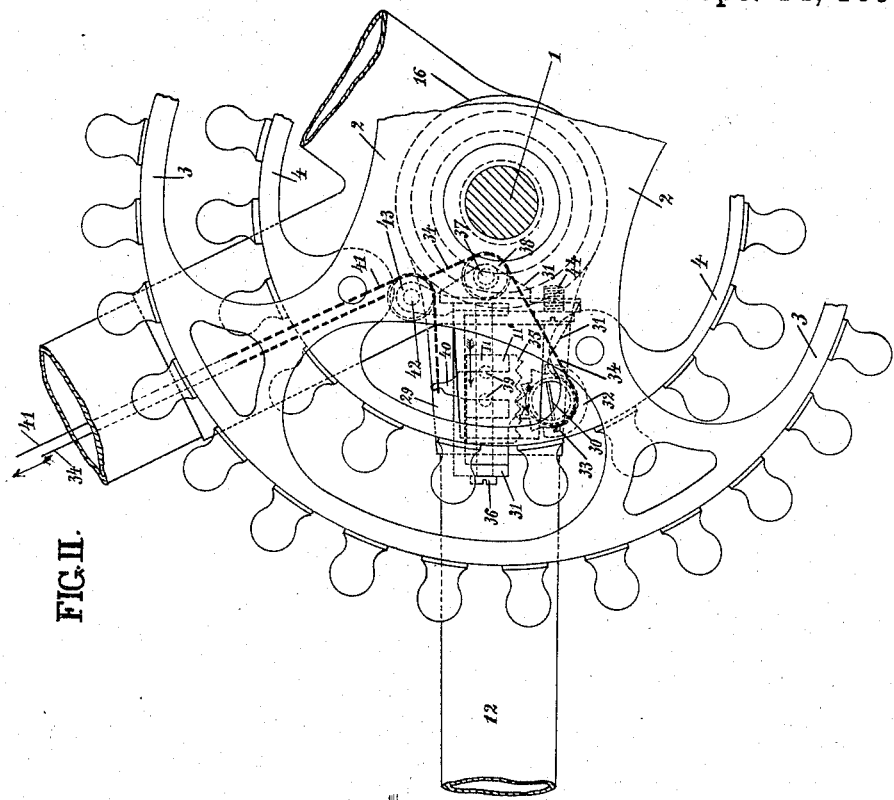
FIG. II.
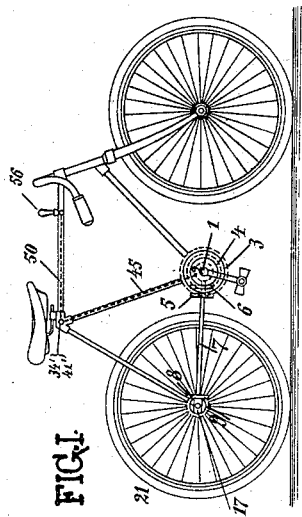
FIG. I.
WITNESS
INVENTOR
Désiré Charles Mérigeault
by
Attys

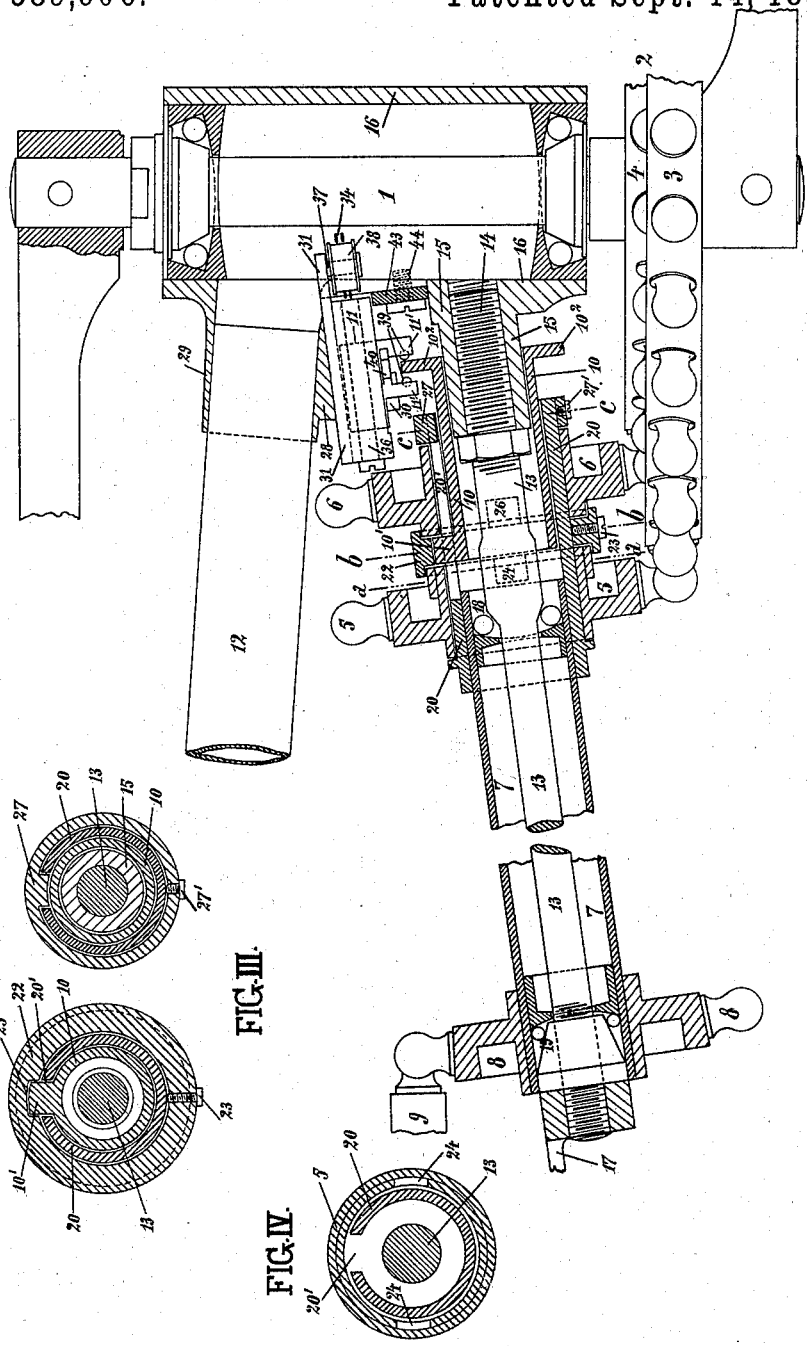

(No Model.) 3 Sheets—Sheet 3.
D. C. MÉRIGEAULT.
CHAINLESS CYCLE AND AUTOMOBILE CAR.
No. 589,906. Patented Sept. 14, 1897.
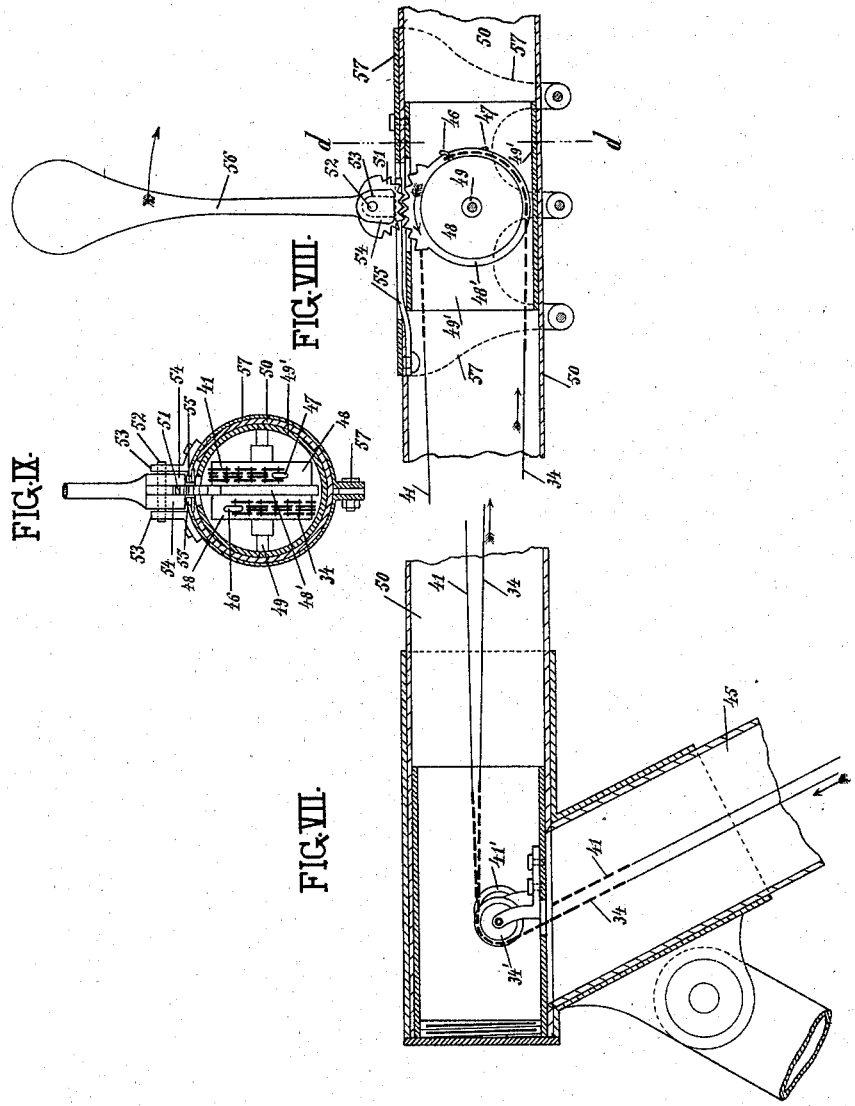
WITNESS:
INVENTOR
Désiré Charles Mérigeault
by
Attys.

UNITED STATES PATENT OFFICE.

DÉSIRÉ CHARLES MÉRIGEAULT, OF VERDUN, FRANCE.

CHAINLESS CYCLE OR AUTOMOBILE CAR.

SPECIFICATION forming part of Letters Patent No. 589,906, dated September 14, 1897.

Application filed January 7, 1897. Serial No. 618,395. (No model.)

*To all whom it may concern:*

Be it known that I, DÉSIRÉ CHARLES MÉRIGEAULT, of Verdun, France, have invented some new and useful Improvements in Chainless Cycles or Automobile Cars, of which the following is a specification.

My invention relates to improvements in chainless cycling-machines and automobile cars. Its object is to produce a transmission device for such vehicles permitting changing the multiplication and in which the motive power is transmitted from the treadle-axle or the arbor of the motor to the driving-wheel by means of special gearings working very softly and not liable to get dirty. Besides their being so constructed as to allow the speed of the machine to be changed the gearings permit throwing the driving-wheel out of gear altogether, so that slopes may be descended with such a wheel without having the treadle-axle turn.

The invention will hereinafter be described, by way of example, as applied to a bicycle.

In the accompanying drawings, Figure 1 shows, on a small scale, a bicycle with the new transmission device. Fig. 2 illustrates in actual size and as a side view, partly uncovered, the treadle apparatus with the moving pinion and a part of the organs for the change of multiplication — namely, those which are mounted directly on the box of the treadle apparatus. The other organs for the change of transmission have been omitted in this figure in order to prevent the drawings from becoming obscure. Fig. 3 is a plan of the transmission. In this figure all the organs for the change of multiplication, as well as the different pinions of the transmission, are shown. Fig. 4 is a section through the line *a a* of Fig. 3. Fig. 5 is a similar section through the line *b b*, and Fig. 6 a section through the line *c c* of Fig. 3. Figs. 7 and 8 are longitudinal sections of those parts of the frame-tubes through which pass the chains or belts of transmission which operate the change of multiplication. Fig. 9 is a cross-section through the line *d d* of Fig. 8.

In the axle of the treadles 1 is the pinion 2, which is provided with two indented crowns 3 and 4, of different diameter. These crowns gear constantly with either one of the small pinions 5 and 6, which are mounted on the horizontal frame-tube 7, which is revoluble and forms their axle.

By means of an arrangement described below the pinions 5 and 6 may be rendered either stationary or revolving, as the case may be. The one of the two which just revolves with its axle transmits its movement to the indented pinion 8, fastened on the extreme after end of this arbor or tube. The pinion 8 gears with the pinion 9, fastened to the axle of the driving-wheel 21 of the bicycle, and thus propels the machine.

The teeth of all the pinions are not of the ordinary form, but spherical, or nearly so, as shown by the drawings. Indeed, this form of the teeth causes the whole mechanism to gear and roll very softly and makes it impossible that the working of the machine be impaired by dirt, because the points of contact of the teeth, in consequence of the peculiar form of the latter, keep always clear of dirt.

The parts of the machine destined to render the pinions 5 and 6 stationary or movable at will have to be divided in two groups, one of which comprising as its principal organ the sliding tubular coupling-box 10, while the other is characterized by the sliding carriage 11, apt to glide forward and backward and causing the said coupling-box 10 to follow its movement. Only this latter group of organs is shown in Fig. 2.

I shall first describe the sliding coupling-box and the organs connected therewith.

In the frame the tube 12, one of the branches of the horizontal fork, is the same as in the ordinary bicycle, (see Fig. 3,) but the other tube of the said fork is replaced by a rod 13, which is screwed together by means of a screw-box 14 with the wormed flush joint 15 and the treadle-box 16. On the other end of the rod 13 is screwed on the frame 17, which supports, together with the flattened end of the tube 12, the axle of the driving-wheel 21. Only part of the frame 17 is shown in Fig. 3. Round the rod 13 turns on the bearing-cones 18 and 19 the tube 7. At the front end of this tube the sleeve 20 is soldered or otherwise securely fastened, so as to form one body with the said tube. This sleeve is provided with a longitudinal notch or cut 20'. In the interior of the sleeve 20 and on the tubulure of the flush joint 15 slides longitudinally the coupling-box 10, mentioned above. This organ permits to have the pinions 5 and 6 either firmly connected with the socketed arbor or to run freely round the same, as the case may be. Indeed, those pinions are mounted in such a way that they freely turn round the cut sleeve 20. They are separated from one another by a ring 22, which is fastened to the sleeve with a screw 23. The naves of the pinions 5 and 6 and the ring 22 have inside notches 24, 26, and 25, destined to receive the tooth or tappet 10', which, placed at the rear end of the coupling-box 10, is of such dimensions as to pass through the cut 20' and to match with the notches heretofore mentioned. At its front end the coupling-box 10 is provided with an annular rib $10^2$, by which it is caught and moved when it shall be displaced.

27 is a ring which by means of a screw 27' is fastened to the end of the sleeve 20 and which, together with the ring 22, is destined to keep the different organs in place on the sleeve 20 and on the tube 7, which forms one body with the said sleeve.

The organs serving to displace longitudinally and at will the coupling-box 10 are disposed in the following manner: On a thickened part 28 of the flush joint 29 of the tube 12 is fastened by a screw 30 the small link 31 so that it is parallel to the tube 7. The screw 30 serves at the same time as axle for the pulley 32, the circumference of which is partly smooth and partly indented. The smooth part bears a hook 33, to which is attached a chain 34. The indented part of the pulley gears with the lower and indented side 35 of the carriage 11, sliding freely on the bolt 36, which is borne by the link 31. This latter bears also on a pin 37 a pulley 38, under which runs the chain 34. On its outer side the carriage 11 has two projecting arms 11' 11', provided with sleepers 39 39, which catch the rib $10^2$ of the coupling-box 10. (See Fig. 2.) In the lower part of the carriage 11 is fastened the hook 40, to which is attached a second chain 41, running under a pulley 42, which is mounted on the drum 43. This arm is fastened to the treadle-box 16 with a screw 44.

My system comprises still a third group of organs—namely, those by the aid of which the cyclist controls the movements of the organs for the change of multiplication described above.

The chains 34 and 41 run through the frame-tube 45, pass over the pulleys 34' and 41, respectively, (see Fig. 7,) which are mounted in a suitable way, and are attached to the hooks 46 and 47. These are fastened on the periphery of the double pulley 48, which is mounted on the trunnion 49 in the tube 49', which has its place in the horizontal frame-tube 50. The middle part 48' of the pulley 48 is partly indented and gears with the indented sector 51, mounted on the trunnion 52 of the supports 53, placed on the tube 50. The thickened parts 54 of the sides of the indented sector 51 press against the springs 55, which are suitably fastened on the tube 50, and keep the sector in its different positions. The arrangement of these resorts or springs is the same as in ordinary pocket-knives. The indented sector is provided with a lever of suitable length, 56. 57 is a flange by means of which the organs are fastened to the tube 50.

The working of the system described is as follows: When the different organs are in a position as shown by the drawings, the pinions 5 and 6 turn loose on the socket 20. If the treadles were worked, the pinion 2 would not turn the arbor 7. In other words, the transmission would not work, so that one might descend a slope on the machine having the feet resting on the treadles, which do not move. When the cyclist arrives at the end of the slope and desires to drive with great speed on the horizontal road—that is to say, if he wishes to have a great multiplication—he has only to move the handle or lever 56 forward and down on the tube 50. If he does so, the indented sector 51 will cause the pulley 48 to turn in the direction of the arrow, whereby the chain 34 is caught and causes the indented pulley 32 to also turn in the direction of the arrow. As a consequence of this the carriage 11 will go back in the direction of the arrow and catch the bearing-cones of its arms 11', and the coupling-box 10, the tooth or tappet of which, 10', enters the notch 24 of the pinion 5, whereby this pinion and the coupling-box 10 are joined, and as the said coupling-box cannot turn without turning at the same time the socket 20, which is also caught by the tappet 10', it follows that the arbor 7, which forms one body with the sleeve 20, turns with the pinion 5. Now, as the pinion 5 gears with that crown of the pinion 2 which has a large diameter, it is obvious that the multiplication must necessarily be great.

In order to obtain the little multiplication which may be desirable when the cyclist ascends a slope, it is only necessary to move the lever or handle 56 backward and down on the tube 50. If this is done, the pulley 48 will turn in the opposite direction of the arrow, and the chain 41 drawn on will cause the carriage 11 to move forward and catch the coupling-box 10. The tappet 10' of the latter would traverse the notch 25 of the ring 23, cause the pinions 5 and 6 to turn loose for a moment, and enter thereafter the notch 26 of the pinion 6, which would be connected now with the arbor 7. Now, as the pinion 6 gears with the crown 4, which has a small diameter, it is plain that in this case the multiplication must be small.

What I claim is—

In combination the crank-axle and rear wheel, the two gear-wheels carried by the crank-axle, the rotatable sleeve carrying two gears loosely journaled thereon and engaging the gears on the crank-axle, recesses formed in said gears, a rotary member connected with the rotary sleeve, a supporting-journal for the rotary member and driving connections between such rotary member and the rear wheel, the sliding sleeve within the rotatable sleeve having a lug or projection adapted to engage with one or the other of said recesses, the way secured to the machine-frame parallel to said sleeve, the carriage traveling in said way and having a connection with the sleeve, and means for reciprocating the carriage to move the sleeve to cause it to engage one or the other of the gears, substantially as described.

In testimony that I claim the foregoing as my invention I have signed my name, in presence of two witnesses, this 28th day of October, 1896.

DÉSIRÉ CHARLES MÉRIGEAULT.

Witnesses:
    D. BOURDEN,
    P. OFFIEMARTUM.